United States Patent
Stephens

(10) Patent No.: US 6,698,993 B2
(45) Date of Patent: Mar. 2, 2004

(54) TRANSPORTER

(76) Inventor: Anthony Leon Stephens, Darlington Park, Peachey Road, Ormeau, Queensland, 4208 (AU)

( * ) Notice: Subject to any disclaimer, the term of this patent is extended or adjusted under 35 U.S.C. 154(b) by 67 days.

(21) Appl. No.: 09/984,729

(22) Filed: Oct. 31, 2001

(65) Prior Publication Data

US 2003/0082033 A1 May 1, 2003

(51) Int. Cl.$^7$ ............................................... B65G 67/30
(52) U.S. Cl. ...................... 414/332; 414/376; 414/488; 414/489; 414/528; 366/153.3
(58) Field of Search ................. 414/332, 376, 414/488, 489, 528; 366/153.3

(56) References Cited

U.S. PATENT DOCUMENTS

| | | | | |
|---|---|---|---|---|
| 4,494,903 A | * | 1/1985 | Badicel et al. | 414/376 |
| 4,512,705 A | * | 4/1985 | Gutsch | 414/327 |
| 4,792,234 A | * | 12/1988 | Doherty | 366/14 |
| 5,971,600 A | * | 10/1999 | Paterson et al. | 366/150.1 |

FOREIGN PATENT DOCUMENTS

| | | |
|---|---|---|
| AU | 545391 | 4/1984 |
| AU | 56179/86 | 11/1986 |
| DE | 4412680 | * 10/1995 |

* cited by examiner

*Primary Examiner*—Steven A. Bratlie
(74) *Attorney, Agent, or Firm*—Young & Thompson

(57) ABSTRACT

A transporter is adapted to tip by using bilateral rams on opposite sides of a main compartment in the form of an open topped bin. The main bin is V-shaped in profile and when the trailer is tipped a conveyor underneath the bin raises an ingredient flowing from the bin. The bin is divided by flow-promoting dividers which are asymmetric in profile, each divider has a front face defined by an included angle "A" of about 34° and a rear face defined by an included angle "B" of about 75°, measured from the horizontal when the bin is in a horizontal transport position. Faces of adjacent dividers converge to a flow through passage that an ingredient flows along the V-sides of the bin and the faces directly through the flow through passages.

29 Claims, 5 Drawing Sheets

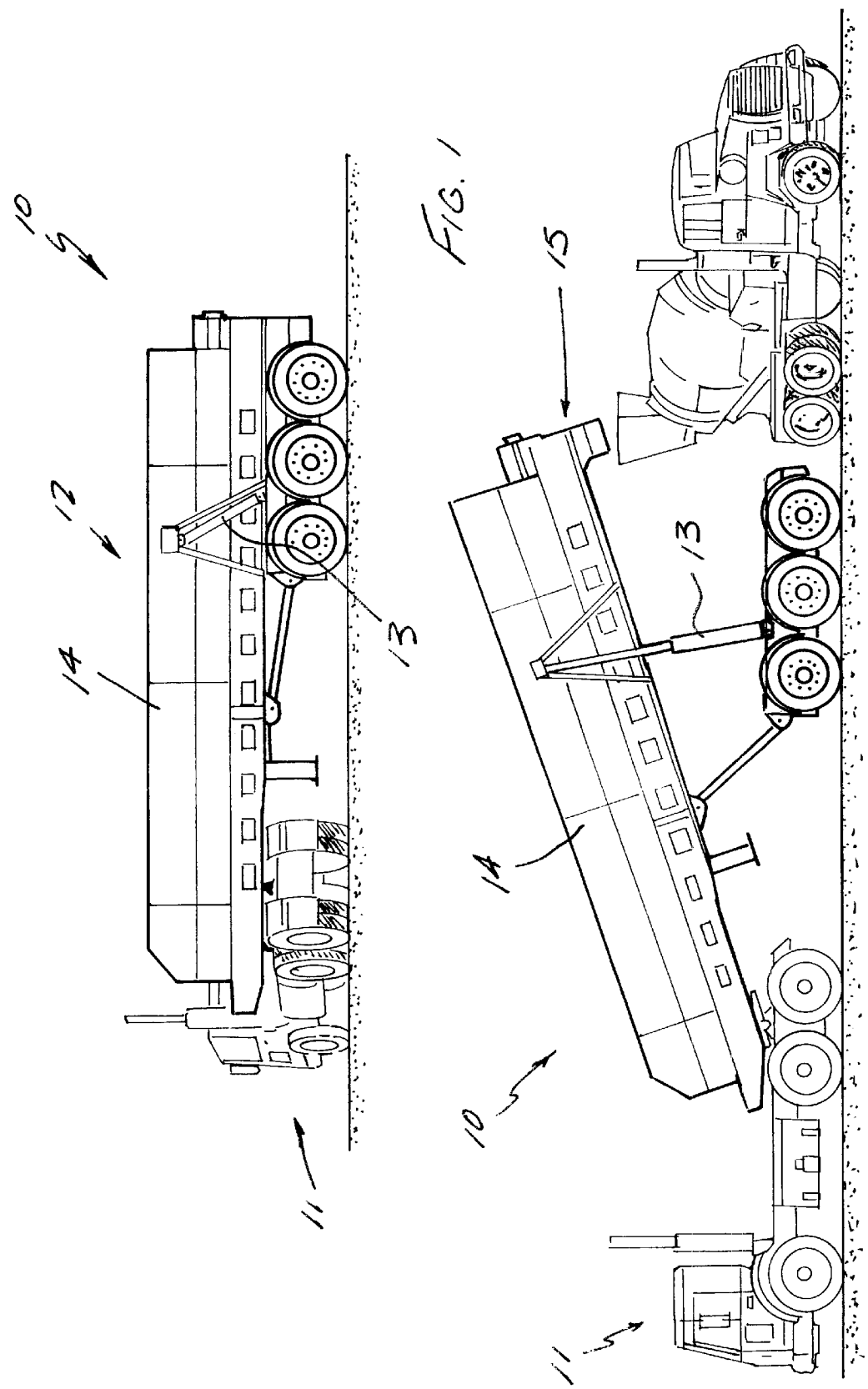

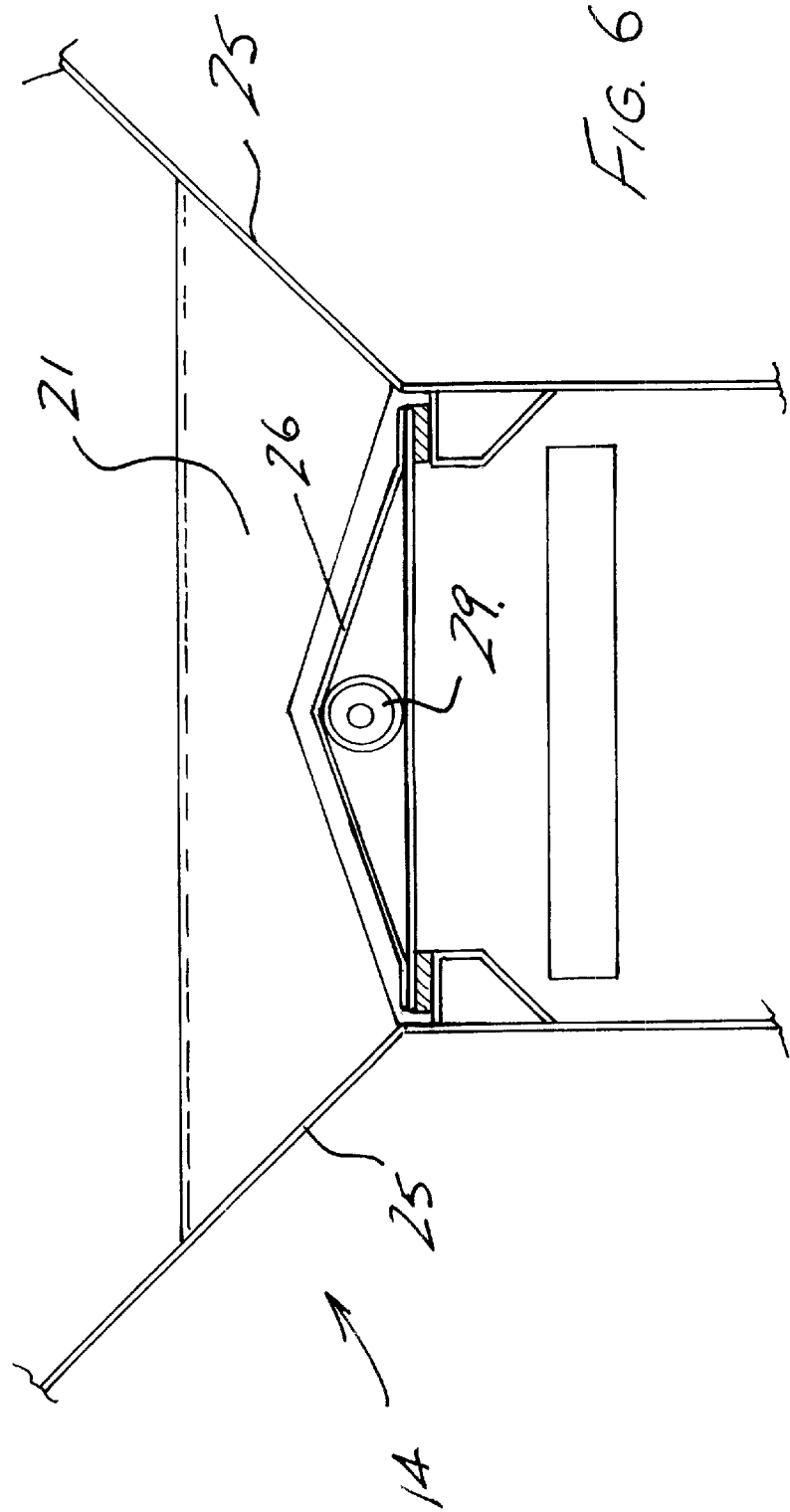

TRANSPORTER

TECHNICAL FIELD OF THE INVENTION

THIS INVENTION relates to a transporter and in particular but not limited to a transporter for at least one batch of unmixed ingredients used for subsequent mixing.

BACKGROUND TO THE INVENTION

Australian Patent No. 545391 and Patent Application 56179/86 describe a transporter for transporting two batches of unmixed ingredients of concrete and able to discharge each batch so that the batch may be mixed on-site using a conventional concrete mixer. It is an object of the present invention to provide an improved transporter of the type described in the abovementioned Patent and Application.

OUTLINE OF THE INVENTION

In one aspect therefore the invention resides in a transporter for unmixed ingredients used for subsequent mixing, the transporter having a front end and a rear discharge end, at least one storage compartment, a conveyor having an upstream end and a downstream end, the downstream end being at or adjacent the discharge end, a flow through passage communicating with the storage compartment, a closure moveable between open and closed positions for flow of an ingredient from the storage compartment to the conveyor, the storage compartment having convergent walls promoting flow through the flow through passage and longitudinally spaced flow promoting dividers promoting flow through the flow through passage, lift means able to raise the rear discharge end of the transporter to a raised discharge position so that when the closure is open, the conveyor can discharge the ingredient from the raised discharge end.

The at least one storage compartment typically comprises a longitudinally extending bin having a V-shaped profile. Additional compartments for other ingredients may be provided at the front and/or rear of the first mentioned compartment.

The conveyor is typically an endless belt conveyor or an auger located directly below the first mentioned compartment.

The flow through passage is typically an opening or multiple spaced openings in a bottom section of the at least one storage compartment. Preferably, the flow through passage comprises spaced openings, each opening being located between the dividers.

The closure is preferably a longitudinally slidable door moveable to block off the flow through passage when in the closed position. Typically, the closure comprises spaced plates, each plate being adapted to locate beneath a flow promoting divider when the plate is in the open position. Preferably each plate has a raised medial section.

The flow promoting dividers spaced along the compartment each typically have a front and a rear face defining a divider having an inverted V-shaped profile. The profile is preferably asymmetric, the rear face being defined by an included angle "A" and the front face by an included angle "B", the angle "A" being greater than the included angle "B", the angles "A" and "B" being taken relative to the horizontal when the vehicle is in a lowered transport position. In one preferred profile the rear face is defined by an included angle of about 75° and the front face by an included angle of about 35°. The angles are taken relative to the horizontal when the vehicle is in a lowered transport position.

The lift means preferably comprises a pair of hydraulic cylinder assemblies, each assembly being positioned on opposite sides of the transporter and being inclined toward the front end of the transporter when in a retracted position and swinging rearward as the transporter is raised.

BRIEF DESCRIPTION OF THE DRAWINGS

In order that the present invention can be more readily understood and be put into practical effect, reference will now be made to the accompanying drawings which illustrate preferred embodiments of the present invention and wherein:

FIGS. 1 and 2 are perspective views showing a transporter according to the invention in respective transport and discharge positions;

FIG. 6 is a part transverse section through 6—6 of FIG. 3 showing the flow promoting dividers and closure arrangement of FIG. 5.

METHOD OF PERFORMANCE

Figure 3:
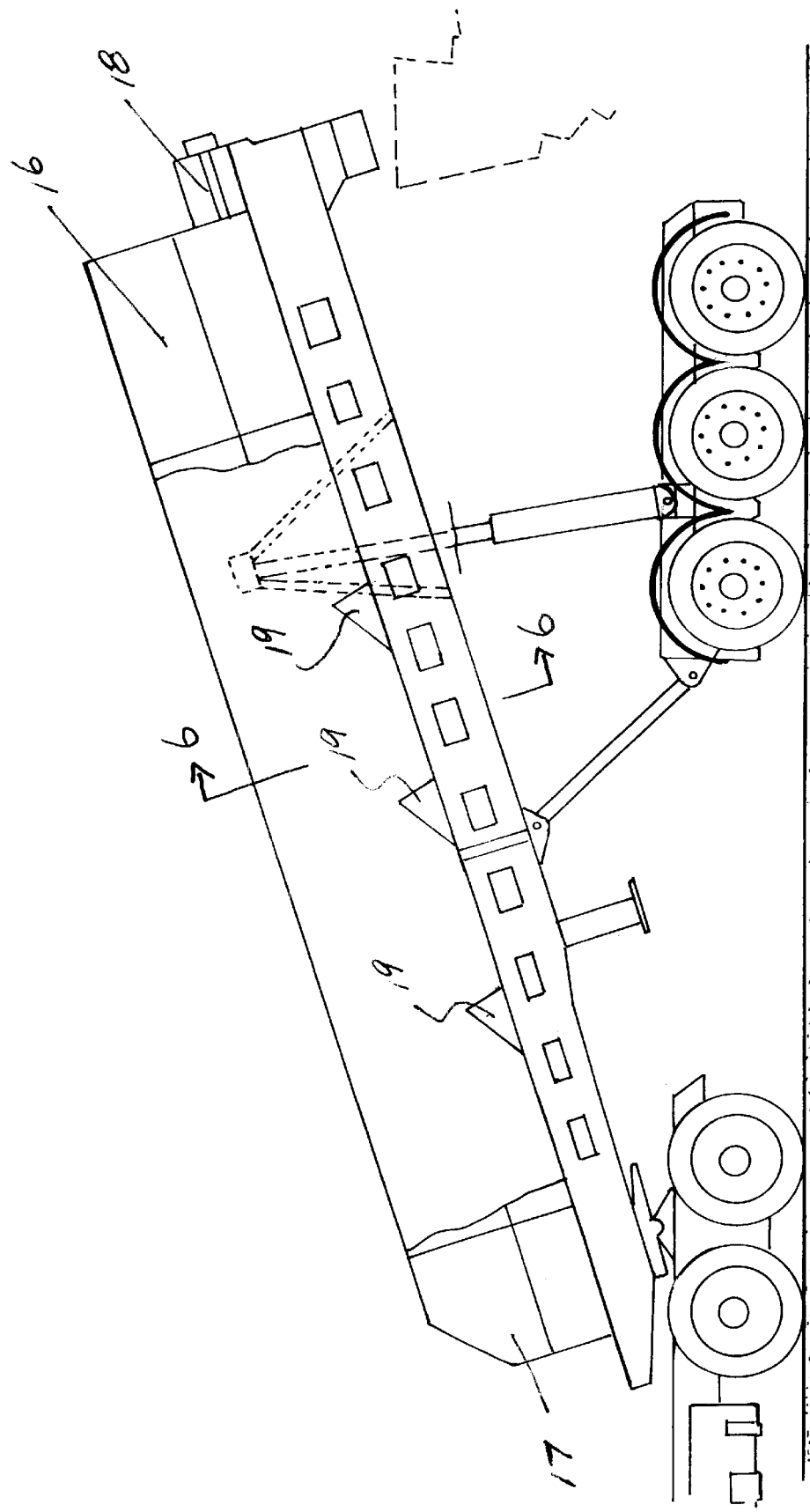
FIG. 3 is a part cut-away side view of the transporter in a raised discharge position.

Referring to the drawings and initially to FIGS. 1 and 2, there is illustrated a transporter 10 having a prime mover 11 and a trailer 12. The trailer 12 is adapted to tip by using bilateral rams 13 on opposite sides of a main compartment in the form of an open topped bin 14. The rams are inclined forward the front of the transporter. The main bin 14 is V-shaped in profile and when the trailer 12 is tipped as shown in FIG. 2 a conveyor underneath the bin 14 raises an ingredient flowing from the bin onto the conveyor so that it may be discharged at 15. In this case, a conventional agitator bowl cement mixer is positioned beneath the trailer to receive aggregate, cement powder and water from the trailer.

FIG. 3 shows the compartments of the trailer 12. The main compartment (bin) 14 holding aggregate is positioned between a cement powder tank 16 at the rear and a water tank 17 at the front. Water is pumped to the discharge 15, a screw dispenser 18 is used to discharge cement powder onto the aggregate carried by the conveyor. The main compartment 14 is divided by flow-promoting dividers 19 which are asymmetric in profile and described in more detail below.

There may be pairs of compartments 14 so that two separate batches of ingredients for two matching agitator bowl loads may be dispensed at different times. A single batched compartment configuration may be used for larger agitators. For example, the bin 14 may be a single bin having a capacity of 10–12 $m^3$ with matching quantities of cement powder and water in the other compartments.

Figure 4:
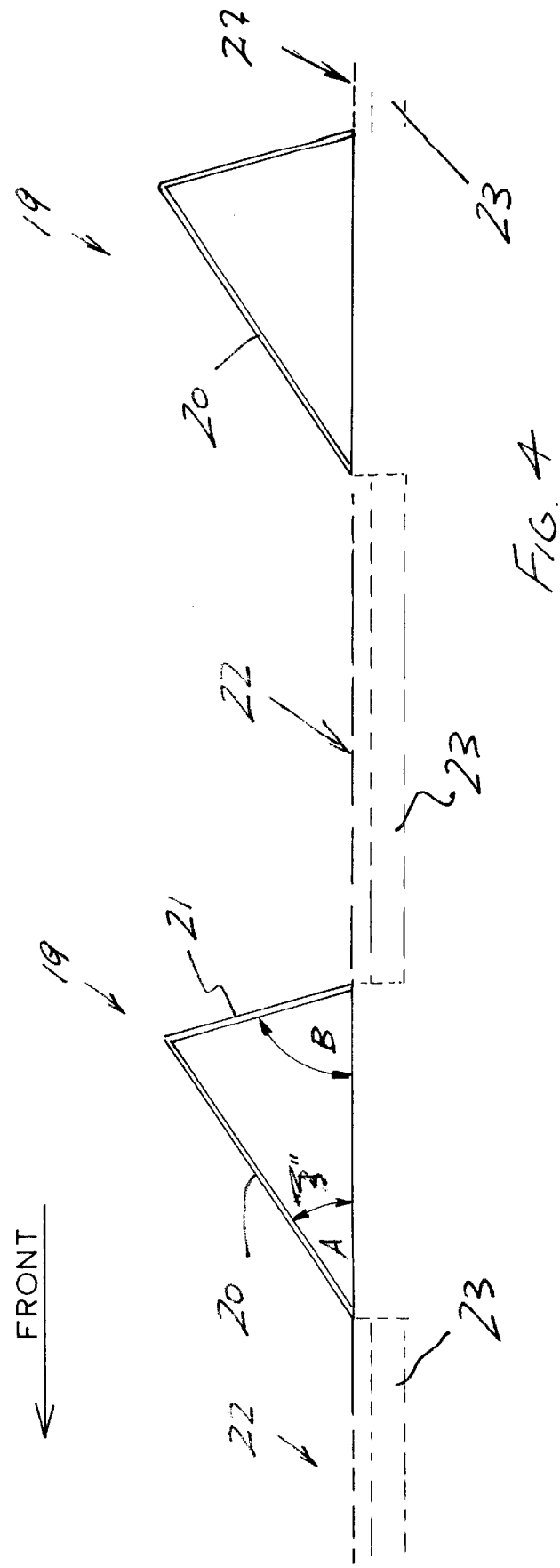
FIG. 4 is a schematic drawing illustrating preferred flow promoting dividers and flow through passage.

FIG. 4 is a schematic showing the transverse flow promoters 19. A front face 20 is defined by an included angle "A" of about 34° while the rear face 21 is defined by an included angle "B" of about 75°. These angles are measured from the horizontal when the bin is in the transport position. The rear face 21 of one divider 19 and the front face 20 of an adjacent divider 19 are 1.2 m–1.5 m apart. Faces 20 and 21 of adjacent dividers 19 converge to a flow through passage 22 so that an ingredient flows along the V-sides of the bin 14 (see FIG. 6) and the faces 20 and 21 directly through the passages 22. Each passage 22 has a retractable closure plate 23 (shown in phantom in FIG. 4).

Figure 5:
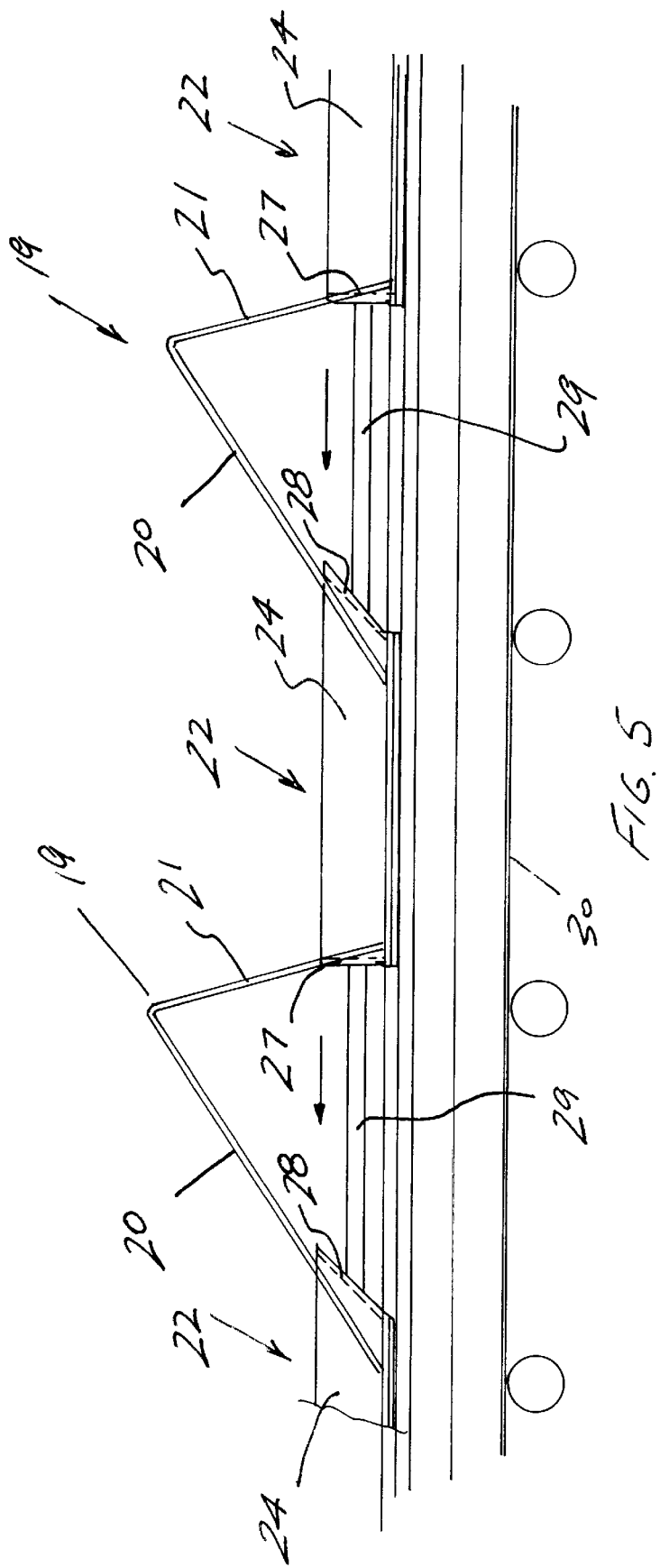
FIG. 5 is a part longitudinal section showing flow promoting dividers in conjunction with a preferred closure and conveyor.

Referring now to FIGS. 5 and 6, a preferred, and alternative, closure plate 24 is illustrated in the form of inverted V-shaped sliding doors. The flow through passage 22 is defined by at least one face of a divider 19 and a lower marginal section of side walls 25 of the bin 14 and being blocked by sliding doors 24. The sliding doors 24 have a raised medial section 26 and are closed off at each end by plates 27 and 28 shown in phantom in FIG. 5. A piston 29 of a hydraulic cylinder assembly is used to open and close the flow through passage by sliding the doors 24 to positions beneath the dividers 19. The ingredient held in the bin 14 flows onto the endless belt conveyor 30, only one run of which is shown. The conveyor may have side idlers to give it a curved cross-section.

Whilst the above has been given by way of illustrative example of the present invention many modification will be apparent to those skilled in the art without departing from the broad ambit and scope of the invention as set out in the appended claims.

What is claimed is:

1. A transporter for unmixed ingredients used for subsequent mixing, comprising:
   a front end and a rear discharge end,
   at least one storage compartment,
   a conveyor having an upstream end and a downstream end, the downstream end being at or adjacent the discharge end,
   a flow through passage communicating with the storage compartment,
   a closure moveable between open and closed positions for flow of an ingredient from the storage compartment to the conveyor, the storage compartment having convergent walls promoting flow through the flow through passage and longitudinally spaced flow promoting dividers promoting flow through the flow through passage,
   lift means able to raise the rear discharge end of the transporter to a raised discharge position so that when the closure is open, the conveyor can discharge the ingredient from the raised discharge end,
   the flow promoting dividers being configured to promote optimal flow when the discharge end is in the raised position.

2. A transporter according to claim 1 wherein the flow promoting dividers spaced along the compartment each have a front and a rear face defining a divider having an inverted V-shaped profile, the profile being asymmetric, the rear face being defined by an included angle "A" and the front face by an included angle "B", the angle "A" being greater than the included angle "B", the angles "A" and "B" being taken relative to the horizontal when the vehicle is in a lowered transport position.

3. A transporter according to claim 2 wherein the at least one storage compartment comprises a longitudinally extending bin having a V-shaped profile and compartments for other ingredients are provided at the front and rear of the at least one compartment, the flow promoting dividers spaced along the compartment each have a front and a rear face defining a divider having an inverted V-shaped profile.

4. A transporter according to claim 1 wherein the flow promoting dividers spaced along the compartment each have a front and a rear face defining a divider having an inverted V-shaped profile, the profile being asymmetric, the rear face being defined by an included angle of about 75° and the front face by an included angle of about 35°, the angles being taken relative to the horizontal when the vehicle is in a lowered transport position.

5. A transporter according to claim 4 wherein the at least one storage compartment comprises a longitudinally extending bin having a V-shaped profile and compartments for other ingredients are provided at the front and rear of the at least one compartment, the lift means comprises a pair of hydraulic cylinder assemblies, each assembly being positioned on opposite sides of the transporter and being inclined toward the front end of the transporter when in a retracted position and being able to swing rearward as the transporter is raised, one of the other compartments being a water tank compartment.

6. A transporter according to claim 1 wherein the conveyor is an endless belt conveyor located directly below the at least one compartment, the closure comprises spaced plates, each plate being adapted to locate beneath a flow promoting divider when the plate is in the open position, each plate having a raised medial section.

7. A transporter according to claim 1 wherein the conveyor is an endless belt conveyor located directly below the at least one compartment, the flow promoting dividers spaced along the compartment each have a front and a rear face defining a divider having an inverted V-shaped profile, the profile being asymmetric, the rear face being defined by an included angle "A" and the front face by an included angle "B", the angle "A" being greater than the included angle "B", the angles "A" and "B" being taken relative to the horizontal when the vehicle is in a lowered transport position.

8. A transporter according to claim 1 wherein the conveyor is an endless belt conveyor located directly below the at least one compartment, the flow promoting dividers spaced along the compartment each have a front and a rear face defining a divider having an inverted V-shaped profile, the profile being asymmetric, the rear face being defined by an included angle of about 75° and the front face by an included angle of about 35°, the angles being taken relative to the horizontal when the vehicle is in a lowered transport position.

9. A transporter according to claim 1 wherein the flow through passage comprises spaced openings, each opening being located between the flow promoting dividers, the closure comprises spaced plates, each plate being adapted to locate beneath a flow promoting divider when the plate is in the open position, each plate having a raised medial section.

10. A transporter according to claim 1 wherein the flow through passage comprises spaced openings, each opening being located between the flow promoting dividers, the flow promoting dividers spaced along the compartment each have a front and a rear face defining a divider having an inverted V-shaped profile, the profile being asymmetric, the rear face being defined by an included angle "A" and the front face by an included angle "B", the angle "A" being greater than the included angle "B", the angles "A" and "B" being taken relative to the horizontal when the vehicle is in a lowered transport position.

11. A transporter according to claim 1 wherein the flow through passage comprises spaced openings, each opening being located between the flow promoting dividers, the flow promoting dividers spaced along the compartment each have a front and a rear face defining a divider having an inverted V-shaped profile, the profile being asymmetric, the rear face being defined by an included angle of about 75° and the front face by an included angle of about 35°, the angles being taken relative to the horizontal when the vehicle is in a lowered transport position.

12. A transporter according to claim 1 wherein the flow through passage comprises spaced openings, each opening being located between the flow promoting dividers, the lift means comprises a pair of hydraulic cylinder assemblies, each assembly being positioned on opposite sides of the transporter and being inclined toward the front end of the transporter when in a retracted position and being able to swing rearward as the transporter is raised.

13. A transporter according to claim 1 wherein the closure comprises a longitudinally slidable door moveable to block off the flow through passage when the closure is in the closed position, the closure comprises spaced plates, each plate being adapted to locate beneath a flow promoting divider when the plate is in the open position.

14. A transporter according to claim 1 wherein the closure comprises a longitudinally slidable door moveable to block off the flow through passage when the closure is in the closed position, the flow promoting dividers spaced along the compartment each have a front and a rear face defining a divider having an inverted V-shaped profile, the profile being asymmetric, the rear face being defined by an included angle "A" and the front face by an included angle "B", the angle "A" being greater than the included angle "B", the angles "A" and "B" being taken relative to the horizontal when the vehicle is in a lowered transport position.

15. A transporter according to claim 1 wherein the closure comprises a longitudinally slidable door moveable to block off the flow through passage when the closure is in the closed position, the flow promoting dividers spaced along the compartment each have a front and a rear face defining a divider having an inverted V-shaped profile, the profile being asymmetric, the rear face being defined by an included angle of about 75° and the front face by an included angle of about 35°, the angles being taken relative to the horizontal when the vehicle is in a lowered transport position.

16. A transporter according to claim 1 wherein the closure comprises a longitudinally slidable door moveable to block off the flow through passage when the closure is in the closed position, the lift means comprises a pair of hydraulic cylinder assemblies, each assembly being positioned on opposite sides of the transporter and being inclined toward the front end of the transporter when in a retracted position and being able to swing rearward as the transporter is raised.

17. A transporter according to claim 1 wherein the closure comprises spaced plates, each plate being adapted to locate beneath a flow promoting divider when the plate is in the open position, each plate having a raised medial section.

18. A transporter according to claim 1 wherein the closure comprises spaced plates, each plate being adapted to locate beneath a flow promoting divider when the plate is in the open position, the flow promoting dividers spaced along the compartment each have a front and a rear face defining a divider having an inverted V-shaped profile.

19. A transporter according to claim 1 wherein the closure comprises spaced plates, each plate being adapted to locate beneath a flow promoting divider when the plate is in the open position, the flow promoting dividers spaced along the compartment each have a front and a rear face defining a divider having an inverted V-shaped profile, the profile being asymmetric, the rear face being defined by an included angle "A" and the front face by an included angle "B", the angle "A" being greater than the included angle "B", the angles "A" and "B" being taken relative to the horizontal when the vehicle is in a lowered transport position.

20. A transporter according to claim 1 wherein the closure comprises spaced plates, each plate being adapted to locate beneath a flow promoting divider when the plate is in the open position, each plate having a raised medial section, the flow promoting dividers spaced along the compartment each have a front and a rear face defining a divider having an inverted V-shaped profile, the profile being asymmetric, the rear face being defined by an included angle "A" and the front face by an included angle "B", the angle "A" being greater than the included angle "B", the angles "A" and "B" being taken relative to the horizontal when the vehicle is in a lowered transport position.

21. A transporter according to claim 1 wherein the closure comprises spaced plates, each plate being adapted to locate beneath a flow promoting divider when the plate is in the open position, each plate having a raised medial section, the flow promoting dividers spaced along the compartment each have a front and a rear face defining a divider having an inverted V-shaped profile, the profile being asymmetric, the rear face being defined by an included angle of about 75° and the front face by an included angle of about 35°, the angles being taken relative to the horizontal when the vehicle is in a lowered transport position.

22. A transporter according to claim 1 wherein the closure comprises spaced plates, each plate being adapted to locate beneath a flow promoting divider when the plate is in the open position, each plate having a raised medial section, the lift means comprises a pair of hydraulic cylinder assemblies, each assembly being positioned on opposite sides of the transporter and being inclined toward the front end of the transporter when in a retracted position and being able to swing rearward as the transporter is raised.

23. A transporter according to claim 1 wherein the flow promoting dividers spaced along the compartment each have a front and a rear face defining a divider having an inverted V-shaped profile, the flow promoting dividers spaced along the compartment each have a front and a rear face defining a divider having an inverted V-shaped profile, the profile being asymmetric, the rear face being defined by an included angle of about 75° and the front face by an included angle of about 35°, the angles being taken relative to the horizontal when the vehicle is in a lowered transport position.

24. A transporter according to claim 1 wherein the flow promoting dividers spaced along the compartment each have a front and a rear face defining a divider having an inverted V-shaped profile, the profile being asymmetric, the rear face being defined by an included angle "A" and the front face by an included angle "B", the angle "A" being greater than the included angle "B", the angles "A" and "B" being taken relative to the horizontal when the vehicle is in a lowered transport position, the lift means comprises a pair of hydraulic cylinder assemblies, each assembly being positioned on opposite sides of the transporter and being inclined toward the front end of the transporter when in a retracted position and being able to swing rearward as the transporter is raised.

25. A transporter according to claim 1 wherein the at least one storage compartment comprises a longitudinally extending bin having a V-shaped profile and compartments for other ingredients are provided at the front and rear of the at least one compartment, the conveyor is an endless belt conveyor located directly below the at least one compartment, the flow through passage comprises spaced openings, each opening being located between the flow promoting dividers, the closure comprises a longitudinally slidable door moveable to block off the flow through passage when the closure is in the closed position, the closure comprises spaced plates, each plate being adapted to locate beneath a flow promoting divider when the plate is in the open position.

26. A transporter according to claim 1 wherein the at least one storage compartment comprises a longitudinally extending bin having a V-shaped profile and compartments for other ingredients are provided at the front and rear of the at least one compartment, the conveyor is an endless belt conveyor located directly below the at least one compartment, the flow through passage comprises spaced openings, each opening being located between the flow promoting dividers, the closure comprises a longitudinally slidable door moveable to block off the flow through passage when the closure is in the closed position, the closure comprises spaced plates, each plate being adapted to locate beneath a flow promoting divider when the plate is in the open position, each plate having a raised medial section.

27. A transporter according to claim 1 wherein the at least one storage compartment comprises a longitudinally extending bin having a V-shaped profile and compartments for other ingredients are provided at the front and rear of the at least one compartment, the conveyor is an endless belt conveyor located directly below the at least one compartment, the flow through passage comprises spaced openings, each opening being located between the flow promoting dividers, the closure comprises a longitudinally slidable door moveable to block off the flow through passage when the closure is in the closed position, the flow promoting dividers spaced along the compartment each have a front and a rear face defining a divider having an inverted V-shaped profile.

28. A transporter comprising:
   a front end and a rear discharge end,
   at least one storage compartment,
   a conveyor having an upstream end and a downstream end, the downstream end being at or adjacent the discharge end,
   a flow through passage communicating with the storage compartment,
   a closure moveable between open and closed positions for flow of an ingredient from the storage compartment to the conveyor, the storage compartment having convergent walls promoting flow through the flow through passage and longitudinally spaced flow promoting dividers promoting flow through the flow through passage,
   a lift able to raise the rear discharge end of the transporter to a raised discharge position so that when the closure is open, the conveyor can discharge the ingredient from the raised discharge end, wherein,
   the flow promoting dividers spaced along the compartment each have a front and a rear face defining a divider having an inverted V-shaped profile,
   the profile being asymmetric,
   the rear face being defined by an included angle of about 75° and the front face by an included angle of about 35°, the angles being taken relative to the horizontal when the vehicle is in a lowered transport position,
   the lift comprises a pair of hydraulic cylinder assemblies, each assembly being positioned on opposite sides of the transporter and being inclined toward the front end of the transporter when in a retracted position and being able to swing rearward as the transporter is raised.

29. A transporter for unmixed ingredients used for subsequent mixing, comprising:
   a front end and a rear discharge end,
   at least one storage compartment,
   a conveyor having an upstream end and a downstream end, the downstream end being at or adjacent the discharge end,
   a flow through passage communicating with the storage compartment,
   a closure moveable between open and closed positions for flow of an ingredient from the storage compartment to the conveyor, the storage compartment having convergent walls promoting flow through the flow through passage and longitudinally spaced flow promoting dividers promoting flow through the flow through passage,
   lift means able to raise the rear discharge end of the transporter to a raised discharge position so that when the closure is open, the conveyor can discharge the ingredient from the raised discharge end,
   wherein,
      the at least one storage compartment comprises a longitudinally extending bin having a V-shaped profile, and
      compartments for other ingredients are provided at the front and rear of the at least one compartment,
      the conveyor is an endless belt conveyor located directly below the at least one compartment,
      the flow through passage comprises spaced openings, each opening being located between the flow promoting dividers,
      the closure comprises a longitudinally slidable door moveable to block off the flow through passage when the closure is in the closed position,
      the flow promoting dividers spaced along the compartment each have a front and a rear face defining a divider having an inverted V-shaped profile, the profile being asymmetric, the rear face being defined by an included angle "A" and the front face by an included angle "B", the angle "A" being greater than the included angle "B", the angles "A" and "B" being taken relative to the horizontal when the vehicle is in a lowered transport position.

* * * * *